United States Patent [19]

Manaresi et al.

[11] Patent Number: 5,393,620
[45] Date of Patent: Feb. 28, 1995

[54] CONDUCTIVE POLYMERS WITH IONIC CONDUCTANCE

[75] Inventors: Piero Manaresi; Anna M. Mastragostino, both of Bologna; Antonio Chiolle, Ferrara; Maria C. Bignozzi, Bologna; Luca Meneghello, Legnago; Andrea Munari; Francesco Pilati, both of Bologna, all of Italy

[73] Assignee: ECP Enichem Polimeri S.r.l., Milan, Italy

[21] Appl. No.: 18,763

[22] Filed: Feb. 17, 1993

[30] Foreign Application Priority Data

Feb. 17, 1992 [IT] Italy ................... MI92A0329

[51] Int. Cl.⁶ ........................... H07M 10/40
[52] U.S. Cl. ........................... 429/192; 528/301
[58] Field of Search ........... 429/198; 252/62.2; 528/301

[56] References Cited

U.S. PATENT DOCUMENTS

| | | | |
|---|---|---|---|
| 4,303,748 | 12/1981 | Armand et al. | 429/192 |
| 4,471,037 | 9/1984 | Bannister | 429/191 |
| 4,943,624 | 7/1990 | Regen | 528/301 |
| 5,049,648 | 9/1991 | Hoeschele | 528/301 |
| 5,051,211 | 9/1991 | Ward et al. | 252/62.2 X |
| 5,194,490 | 3/1993 | Suga et al. | 429/192 X |
| 5,219,679 | 6/1993 | Abraham et al. | 429/192 |

FOREIGN PATENT DOCUMENTS 13199 7/1980 European Pat. Off. .
2568574 2/1986 France .

*Primary Examiner*—Stephen Kalafut
*Attorney, Agent, or Firm*—George P. Hoare, Jr. Rogers & Wells

[57] ABSTRACT

Conductive polymers with ionic conductance including a non-aqueous complex of a polyester having the formula

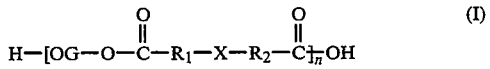

wherein: $R_1$ and $R_2$ are a $C_1$–$C_6$ alkylene radical; G is a bivalent group deriving from H —(—O—$R_3$—)-$_p$—O—$R_3$—OH with p=0 or 1-10 and $R_3$ a $C_1$–$C_6$ alkylene radical; X is $CH_2$, S or O, and n=5–100; with an ionic compound. The polyesters having formula (I) wherein: X=S; $R_1$, $R_2$ and $R_3$ are each —$CH_2$—$CH_2$—; p=1–10 and n=5–100, are also new.

19 Claims, No Drawings

CONDUCTIVE POLYMERS WITH IONIC CONDUCTANCE

The present invention relates to polymers with ionic conductance.

More specifically, the present invention relates to conductive polymers which are non-crystalline at room temperature, having a high ionic conductance and particularly suitable to be used as polymeric electrolytes in electro-chemical devices such as, for example, galvanic cells and electro-optical displays.

Conductive polymers having ionic conductance generally consist of a polymer and an electrolyte. The polymer should contain electron-donor atoms and be capable of dissolving and complexing the electrolyte. The complexes formed by the polymer with the electrolyte have electrical conductivity owing to the ionic transport and are consequently considered as being polymeric electrolytes.

Theoretically, many polymers could have these characteristics. In practice, the systems based on poly(ethylene oxide) (PEO) have been commercially developed and are widely described in literature, such as for example in the lecture of M. C. Armand in the 2nd International Conference on "Solid Electrolytes", held at St. Andrews University (GB) in 1978, or in the lecture of Duval et al. at the "European Symposium on Polymeric Materials" Ist meeting of "European Polymers Federation" at Lyon, Sep. 14, 1987.

Other conductive polymers having solid ionic conductance, based on PEO, are described in the European Patent No. 13.199.

The main disadvantage of the known conductive polymers with ionic conductance lies in the fact that they have a satisfactory conductance only at temperatures higher than room temperature, as they reach a high conductance above glass transition temperature (Tg), if amorphous, or melting point (Tm), if semicrystalline. For this reason, the known conductive polymers are not particularly suitable for use in electro-chemical generators. This behaviour is due to the fact that conductive polymers based on PEO complexmetallic salts have a multiphases nature, composed of crystalline phases rich in salt, or pure polymer and amorphous phases containing dissolved salt.

In the crystalline phases, below the melting point (Tm) the polymeric chains are rigid and consequently the ions remain blocked in their positions of equilibrium, and only above melting point they acquire a flexibility which is sufficient to allow the ionic mobility which is indispensable for ensuring a high conductance.

Various attempts have been made to overcome this draw-back of the known conductive polymers based on PEO, but with scarce results. For example, U.S. Pat. No. 4,471,037 describes the use of a mixture of poly(ethylene-oxide) and poly(vinyl-methyl-ether) as polymeric material. The polymeric electrolyte containing this mixture has improved mechanical characteristics but its conductance at a low temperature is not satisfactory, probably because of the low solubility of the electrolyte in this mixture.

French Patent No. 2.568.574 describes the use of a mixture of poly(ethylene-oxide) and poly(ethylglycolalkylether), as polymeric material. The polymeric electrolyte, including this mixture and an inorganic salt, does not have however the required combination of properties, since an improved conductance at a low temperature corresponds to a deterioration in the mechanical properties.

A proposal has also been made to modify the PEO to reduce the crystalline content. Examples of known modified PEO are "comb" polymers such as poly(oxy-PEO-methacrylate) and poly(oxy-PEO-siloxanes) wherein the chains of linear PEO are attached, like the teeth of a comb, to the olefinic or siloxanic chain respectively. These modified PEOs, however, do not reach sufficient conductance values to be used at room temperature.

The purpose of the present invention is to overcome all these inconveniences.

More specifically, the purpose of the present invention is to provide a polymeric material which enables the preparation of non-crystalline polymeric electrolytes having good mechanical properties with a good conductance at room temperature or at temperatures very close to room temperature.

The Applicant has found a new polymeric product which has the above characteristics.

This new polymeric product is a polyester having the general formula:

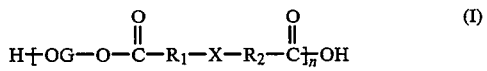

wherein:

$R_1$ and $R_2$, the same or different, are an alkylene radical, linear or branched, containing from 1 to 6 carbon atoms;

G is a bivalent group which remains after the removal of the chain-end hydroxylic groups from a glycol having the formula

wherein $R_3$ is a $C_1$-$C_6$ alkylene radical, linear or branched; p is 0 or an integer between 1 and 10;

X is $CH_2$, sulphur or oxygen, and n is an integer between 5 and 100, preferably between 5 and 50; with the understanding that when X is $CH_2$, p is between 1 and 10 and $R_1$ and $R_2$ may be absent.

The present invention consequently relates to a conductive polymer with ionic conductance, including a non-aqueous complex of a polyester having the above general formula (I) with an ionic compound.

The complexes thus obtained have the advantages, with respect to those based on poly(ethylene-oxide), of not being crystalline at room temperature and of having a high chemical and thermal stability. In addition, they can produce solid or very viscous materials which are colourless and transparent.

The above polyesters having formula (I) wherein:

$R_1$ and $R_2$ are each —$CH_2$—$CH_2$;

G is a bivalent group which remains after the removal of the chain-end hydroxylic groups from a glycol having the formula H—O—$CH_2$—$CH_{2p}$ O—$CH_2$—$CH_2$ OH with p=an integer between 1 and 10;

X is sulphur and n is an integer between 5 and 100, preferably between 5 and 50;

are new and are consequently also subject of the present invention.

The polyesters of the present invention can be prepared using the conventional methods of polycondensation or polytransesterification of a bicarboxilic organic acid or one of its alkyl esters having the formula:

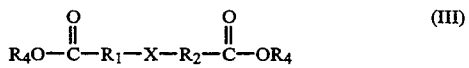
(III)

wherein X, $R_1$ and $R_2$ have the meanings defined above and $R_4$ is hydrogen or an alkyl radical containing from to 3 carbon atoms, with a glycol having formula (II) specified above.

A preferred procedure consists in heating, to 150°–200° C., the ester of bicarboxylic acid, for example dimethyl ester of thio-dipropionic acid, with a molar excess of glycol (at least 1.1 moles of glycol for each mole of acid).

The heating is continued until the methanol has been completely eliminated.

The resulting prepolymer is then brought to a high molecular weight by distillation under vacuum of the excess glycol (polycondensation). During this condensation a further transesterification takes place which leads to an increase in the molecular weight.

To avoid an excessive residence time of the polymer at a high temperature with the possibility of irreversible thermal degradation, it is advantageous to use transesterification catalysts. Although it is possible to use a wide variety of catalysts, the organic titanates, such as for example titanium tetrabutylate, used alone or combined with magnesium or calcium acetates, are preferred. Titanate complexes, obtained by alkaline or earth-alkaline metal alkoxides and esters of titanic acid, are even effective. Inorganic titanates, such as lanthanum titanate; mixtures of calcium acetate-antimonium bioxide; lithium and magnesium alkoxide, the organic derivatives of tin, etc. are examples of other catalysts which can be used.

The polymerizations by transesterification are generally carried out in the molten state, but inert solvents may also be used to facilitate the removal of the volatile components from the mass, operating at lower temperatures.

During the preparation of the polyester of the present invention, it is preferable to add a stabilizer to prevent the oxidative and/orhydrolytic degradation of the reagents and polymer during its formation.

Examples of bicarboxylic organic acids having formula (III) which can be used in the preparation of the polyester of the present invention are: malonic acid, succinic acid, pimelic acid, adipic acid, thiodiacetic acid, thio-dipropionic acid, $\alpha,\alpha'$-thio-dibutyric acid, $\alpha,\alpha'$-thio-diisobutyric acid, $\beta,\beta'$-thiodibutyric acid, $\gamma,\gamma'$-thio-dibutyric acid, thio-divaleric acid, $\gamma,\gamma'$-thio-diisovaleric acid, thio-di(methylpropyl)acetic acid, thio-di(ethyl-propyl)acetic acid, 3,3'-oxy-dipropionic acid, diglycolic acid, etc. These acids may be used alone or mixed with each other.

In particular thio-dipropionic acid is preferred for the purpose of the present invention.

The expression bicarboxylic organic acids also includes the equivalent derivatives of said acids which behave similarly to the bicarboxylic acids in the reaction with the glycols for the formation of polyesters. These equivalent derivatives also include esters or derivatives suitable for forming esters, for example halides and anhydrides. The bicarboxylic acids may contain any substituent group or combination of substituent groups which does not substantially interfere with the formation of the polymer and with the use of the polymer in the end-products according to the present invention.

The glycol used for the preparation of the polyesters of the present invention may be selected from ethylene glycol, di(oxy-ethylene)glycol, tri(oxyethylene)glycol, tetra(oxy-ethylene) glycol and penta(oxy-ethylene)glycol. Poly(oxy-ethylene)glycols with a higher molecular weight could be used.

The ionic compounds used in the preparation of the conductive polymers of the present invention are preferably salts of mono or polyvalent metals and, in particular, of lithium, sodium, potassium, calcium, copper, zinc, magnesium, lead, tin or aluminium.

The salts of lithium are preferred in that this metal is used as an electrode material. It is preferable for the anion to be large in order to reduce its segregation during use, but not so large as to make it immobile. It is also preferable for the anion to be a weak base. Examples of monovalent anions include the derivatives of higher halogens, such as bromine and iodine, the anionic monovalent complexes, preferably perfluorinated, such as for example: $SNC^-$, $ClO_4^-$, $HgI_3^-$, $BF_4^-$, etc., carboxylic groups, preferably perfluorinated, for example of the $C_mF_{2m+1}CO_2^-$ type, such as $CF_3CO_2^-$, $C_2F_5CO_2^-$, $C_3F_7CO_2^-$; sulphonic groups, preferably perfluorinated, for example of the $C_mF_{2m+1}SO_3$ type, such as $CF_3SO_3^-$, wherein in the above general formulae m is an integer from 1 to 6, preferably from 1 to 3.

Lithium perchlorate or lithium fluoborate are preferred.

The concentration of the ionic compound in the polyester is not critical even if it is preferable for the atomic ratio between the hetero atoms —O— and/or —S—, contained in the polymer, and the metal of the ionic compound to be between 4:1 and 25:1.

The conductive polymers of the present invention can be prepared simply and practically using any of the known methods which allow a complete and homogeneous dissolution of the two components. The method generally used is to dissolve the preformed polymer and ionic compound in a suitable solvent, such as acetonitrile, N,N, dimethylacetamide, etc., homogenize the solution by adequate stirring, and then slowly evaporate the solvent under reduced pressure to obtain a film.

A further advantage of the polyesters of the present invention is that the conductive polymers can be prepared by mixing the polyesters and ionic compound directly, preferably under heat and in an inert environment.

The conductive polymers of the present invention produce films having plasticity, flexibility and easy adaptability to a wide variety of forms. This, in turn, allows the production of electrochemical devices with a variable geometry, easily modulated and with a high electrode-surface development.

The conductive polymers of the present invention are characterized by a good thermal and dimensional stability and a high ionic conductance, even at relatively low temperatures, without or practically without a conductivity of electronic type.

The conductive polymers of the present invention can be used as electrolytic separators in devices such as electrochemical generators, electro-optical displays and sensors. The present invention consequently also relates to these devices which incorporate the conductive polymers described above.

The following examples provide a better illustration of the present invention but do not limit it in any way.

All the parts and percentages indicated in the examples are intended as a weight unless otherwise specified.

EXAMPLE 1

31.97 g (155.0 mmoles) of dimethyl ester of thiodipropionic acid ($CH_3OOC$—$CH_2$—$CH_2$—S—$CH_2$—$CH_2$—$COOCH_3$), 18.04 G (170.0 mmoles) of diethylenglycol (HO—$CH_2$—$CH_2$—O—$CH_2$—$CH_2$—OH) and 0.017 g (0.0499 mmoles) of titanium tetrabutylate Ti(OBu)$_4$ as catalyst, were charged into a 100 ml three-necked flask.

The reaction was carried out, under magnetic stirring, initially in a nitrogen flow at 170° C., for 1 hour and 30 minutes, to displace the equilibrium by eliminating the methanol formed. In the subsequent polycondensation stage (with the elimination of the excess glycol), maintaining the same temperature and stirring, a gradual vacuum was applied for 1 hour and conditions of forced vacuum ($10^{-3}$ mmHg) for a further 2 hours.

The polymer obtained, extremely viscous and transparent, was washed in methanol and dried in an oven under vacuum at 80° C. for a night to eliminate all possible traces of solvent. The final yield was 90%.

The structure of the polymer obtained, determined by IR and NMR spectroscopic analysis, resulted as follows:

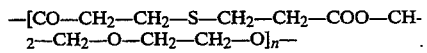

A molecular weight of the polymer obtained of 7000, corresponding to an average value of n=about 28 was measured by analysis with exclusion chromatography techniques (GPC), using a Mixed PL gel column (300 ml, 7.5 mm internal diameter) with a $CHCl_3$ mobile phase (1 ml/min) and using monodispersed polystyrene as a standard.

EXAMPLE 2

27.75 g (134.54 mmoles) of dimethyl ester of thiodipropionic acid, 22.25 g (148.16 mmoles) of triethylenglycol (HO—$CH_2$—$CH_2$—O—$CH_2$—$CH_2$—O—$CH_2$—$CH_2$—OH) and 0.017 g (0.0499 mmoles) of the catalyst Ti(OBu)$_4$ were charged into a 100 ml three-necked flask. The same procedure as Example 1 was then carried out.

The polymer obtained was washed in ethyl ether and dried in an oven under vacuum for a night at 80° C.

The structure of the product, determined by IR and NMR spectroscopic analysis, resulted to be the following:

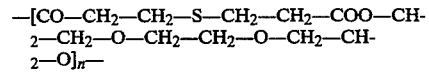

The molecular weight of the polymer obtained, measured by GPC analysis, as in Example 1, was 6500 corresponding to a value of n=about 22.

EXAMPLE 3

24.56 g (119.07 mmoles) of dimethyl ester of thiodipropionic acid, 25.44 g (130.98 mmoles) of tetraethylenglycol (HO—$CH_2$—$CH_2$—O—$CH_2$—$CH_2$—O—$CH_2$—$CH_2$—O—$CH_2$—$CH_2$—OH) and 0.017 g (0.0499 mmoles) of the catalyst Ti(OBu)$_4$ were charged into a 100 ml three-necked flask. The same procedure as Example 1 was then carried out.

The polymer obtained was washed in ethyl ether and dried in an oven under vacuum for a night at 80° C.

The structure of the product, determined by IR and NMR spectroscopic analysis, resulted to be the following:

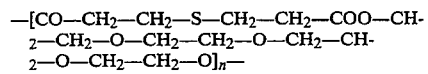

and with a molecular weight of 5000, corresponding to n=about 15, measured by GPC analysis, as in Example 1.

EXAMPLE 4

13.2 g (64.1 mmoles) of dimethyl ester of thiodipropionic acid, 16.8 g (70.5 mmoles) of pentaethylenglycol (HO—$CH_2$—$CH_2$—O—$CH_2$—$CH_2$—O—$CH_2$—$CH_2$—O—$CH_2$—$CH_2$—O—$CH_2$—$CH_2$—OH) and 0.0102 g (0.299 mmoles) of the catalyst Ti(OBu)$_4$ were charged into a 100 ml three-necked flask.

The same procedure as Example 1 was then carried out. The polymer obtained was washed in ethyl ether and dried in an oven under vacuum for a night at 80° C.

The structure of the product, confirmed by IR and NMR spectroscopic analysis, is:

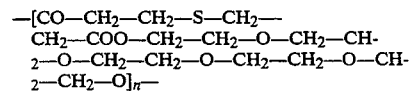

EXAMPLE 5

7.25 g (40.68 mmoles) of thiodipropionic acid (HOOC—$CH_2$—$CH_2$—S—$CH_2$—$CH_2$—COOH), 4.75 g (44.75 mmoles) of diethylenglycol and 0.00408 g (0.012 mmoles) of titanium tetrabutylate Ti(OBu)$_4$ as catalyst were charged into a 100 ml three-necked flask.

The reaction was carried out, under magnetic stirring, initially in a nitrogen flow at 170° C., for 1 hour and 30 minutes, to displace the equilibrium by eliminating the water formed. In the subsequent polycondensation stage (with the elimination of the excess glycol), maintaining the same temperature and stirring, a gradual vacuum was applied for 1 hour and conditions of forced vacuum ($10^{-3}$ mmHg) for a further 2 hours.

The polymer obtained, extremely viscous and transparent, was washed in methanol and dried in an oven under vacuum at 80° C. for a night to eliminate all possible traces of solvent. The final yield was 85%.

The polymer obtained has the structure:

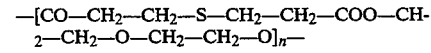

by IR and NMR spectroscopic analyses. The molecular weight of the polymer obtained is 5000, corresponding to n=about 20, determined by GPC analysis, as in Example 1.

EXAMPLE 6

6.23 g (34.96 mmoles) of thiodipropionic acid, 5.77 g (38.42 mmoles) of triethylenglycol and 0.00408 g (0.012 mmoles) of the catalyst Ti(OBu)$_4$ were charged into a 100 ml three-necked flask.

The same procedure as Example 5 was then carried out.

The polymer obtained was washed in ethyl ether and dried in an oven under vacuum for a night at 80° C.

The polymer obtained has the structure:

—[CO—$CH_2$—$CH_2$—S—$CH_2$—$CH_2$—COO—$CH_2$—$CH_2$—O—$CH_2$—$CH_2$—O—$CH_2$—$CH_2$—O]$_n$— determined by IR and NMR spectroscopic analyses and a molecular weight of 4000, corresponding to n=about 14, measured by means of GPC, as in Example 1.

EXAMPLE 7

5.45 g (30.58 mmoles) of thiodipropionic acid, 6.55 g (33.72 mmoles) of tetraethylenglycol and 0.00408 g (0.012 mmoles) of the catalyst Ti(OBu)$_4$ were charged into a 100 ml three-necked flask.

The same procedure as Example 5 was then carried out.

The polymer obtained was washed in ethyl ether and dried in an oven under vacuum for a night at 80° C.

The structure of the polymer obtained, determined by IR and NMR analyses, is:

—[CO—$CH_2$—$CH_2$—S—$CH_2$—$CH_2$—COO—$CH_2$—$CH_2$—O—$CH_2$—$CH_2$—O—$CH_2$—$CH_2$—O—$CH_2$—$CH_2$—O]$_n$— with a molecular weight of 1600, corresponding to n=about 5, determined by means of GPC analysis, as in Example 1.

EXAMPLE 8

23.1 g (144.22 mmoles) of pimelic acid (HOOC—$CH_2$—$CH_2$—$CH_2$—$CH_2$—$CH_2$—COOH), 16.9 g (159.25 mmoles) of diethylenglycol and 0.0136 g (0.04 mmoles) of titaniumtetrabutylate Ti(OBu)$_4$, as catalyst, were charged into a 100 ml three-necked flask.

The reaction was carried out, under magnetic stirring, initially in a nitrogen flow at 170° C., for 1 hour and 30 minutes, to displace the equilibrium by eliminating the water formed. In the subsequent poly-condensation stage (with the elimination of water and the excess glycol), maintaining the same temperature and stirring, a gradual vacuum was applied for 1 hour and conditions of forced vacuum ($10^{-3}$ mmHg) for a further 2 hours.

The polymer obtained, extremely viscous and transparent, was washed in methanol and dried in an oven under vacuum at 80° C. overnight to eliminate all possible traces of solvent. The final yield was 90%.

The structure of the product, confirmed by IR and NMR spectroscopic analyses, corresponded to:

—[CO—$CH_2$—$CH_2$—$CH_2$—$CH_2$—$CH_2$—COO—$CH_2$—$CH_2$—O—$CH_2$—O]$_n$—

EXAMPLE 9

19.7 g (123.0 mmoles) of pimelic acid, 20.3 g (135.18 mmoles) of triethylenglycol and 0.0136 g (0.04 mmoles) of the catalyst Ti(OBu)$_4$ were charged into a 100 ml three-necked flask.

The same procedure as Example 8 was then carried out.

The polymer obtained was washed in ethyl ether and dried in an oven under vacuum, overnight, at 80° C.

The structure of the product, confirmed by IR and NMR analyses, corresponded to:

—[CO—$CH_2$—$CH_2$—$CH_2$—$CH_2$—$CH_2$—COO—$CH_2$—$CH_2$—O—$CH_2$—$CH_2$—O—$CH_2$—O]$_n$—

EXAMPLE 10

Preparation of the conductive polymer

The polymers of the above examples were dried under vacuum at 80° C. for a night and the lithium salt used, lithium perchlorate (LiClO$_4$), was also dried under vacuum for 3 hours at 120° C.

Both products were kept and handled inside a drybox with a humidity content of less than 40 ppm.

Various polymeric mixtures with different quantities of LiClO$_4$ were prepared; the salt was dissolved in the polymer and, to facilitate the solubility, the mixture was heated under stirring and under vacuum at 120° C. for 2 hours.

The compositions of the polymeric mixtures prepared and their ionic specific conductivities at 25° C. and 80° C. are shown in Table I below.

The ionic specific conductivities were determined by impedance measurements. For this purpose the polymeric mixture was put between two steel blocking electrodes composing the cell, and the conductivity measurements were carried out by a Frequence Response Analyzer (SOLARTRON 1255 HF). The data were evaluated on the basis of equivalent circuits by means of a Boukamp fitting program (EQUIVCRT PASS).

TABLE I

| EX | Polymer (grams) | LiClO$_4$ (grams) | (O + S)/Li molar ratio | Spec. conductivity (ohm$^{-1}$ cm$^{-1}$) at | |
|---|---|---|---|---|---|
| | | | | 25° C. | 80° C. |
| 1 | 2.97 | 0.23 | 22 | $4.2\ 10^{-6}$ | $1.5\ 10^{-4}$ |
| 2 | 2.83 | 0.23 | 22 | $5.5\ 10^{-6}$ | $2.2\ 10^{-4}$ |
| 3 | 2.50 | 0.22 | 22 | $1.4\ 10^{-5}$ | $2.4\ 10^{-4}$ |
| 4 | 2.57 | 0.28 | 18 | $1.8\ 10^{-5}$ | $3.7\ 10^{-4}$ |
| 8 | 2.65 | 0.20 | 18 | $7.3\ 10^{-6}$ | $9.2\ 10^{-5}$ |
| 9 | 3.17 | 0.38 | 13 | $9.4\ 10^{-6}$ | $2.3\ 10^{-4}$ |

We claim:

1. Solid polymeric electrolyte with ionic conductance including a non-aqueous complex of a polymer with an ionic compound, characterized in that the polymer is a polyester having the general formula:

$$H \!-\!\!\left[OG\!-\!O\!-\!\overset{\overset{\displaystyle O}{\|}}{C}\!-\!R_1\!-\!X\!-\!R_2\!-\!\overset{\overset{\displaystyle O}{\|}}{C}\right]_{\!\!n}\!\!-\!OH \qquad (I)$$

wherein:

R$_1$ and R$_2$, the same or different, are an alkylene radical, linear or branched, containing from 1 to 6 carbon atoms;

G is a bivalent group which remains after the removal of the chain-end hydroxylic groups from a glycol having the formula $$H\!-\!(\!-\!O\!-\!R_3\!-\!)\!-\!_p O\!-\!R_3\!-\!OH \qquad (II)$$

wherein R$_3$ is a C$_1$-C$_6$ alkylene radical, linear or branched; p is 0 or an integer between 1 and 10;

X is CH$_2$, sulphur or oxygen, and n is an integer between 5 and 100; with the understanding that when X is $CH_2$, p is between 1 and 10 and $R_1$ and $R_2$ may be absent.

2. Solid polymeric electrolyte according to claim 1, wherein n is an integer between 5 and 50.

3. Solid polymeric electrolyte according to claim 1, wherein the ionic compound is a salt of a mono- or polyvalent metal.

4. Solid polymeric electrolyte according to claim 3, wherein the ionic compound is a lithium salt.

5. Solid polymeric electrolyte according to claim 3, wherein the anions of the ionic compound is selected from: anion obtained from higher halogens; anionic monovalent complexes; carboxylic groups of the $C_mF_{2m+1}CO_2^-$ type; and sulphonic groups of the $C_mF_{2m+1}SO_3$ type, wherein in the above general formulae m is an integer from 1 to 6.

6. Solid polymeric electrolyte according to claim 4, wherein the ionic compound is lithium perchlorate or lithium fluoborate.

7. Solid polymeric electrolyte according to claim 3, wherein the mono- or polyvalent metals selected from lithium, sodium, potassium, calcium, copper, zinc, magnesium, lead, tin and aluminum.

8. Solid polymeric electrolyte according to claim 5, wherein the higher halogen is bromine or iodine.

9. Solid polymeric electrolyte according to claim 5, wherein the anion of the ionic compound is selected from perfluorinated anionic monovalent complexes, perfluorinated carboxylic groups, and perfluorinated sulphonic groups.

10. Solid polymeric electrolyte according to claim 5, wherein m is an integer of from 1 to 3.

11. Polyester of general formula:

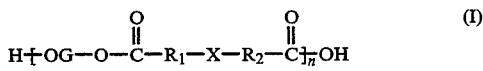
(I)

wherein:
$R_1$ and $R_2$ are each —$CH_2$—$CH_2$—;
G is a bivalent group which remains after the removal of the chain-end hydroxylic groups from a glycol having the formula

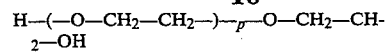

with
p=an integer between 1 and 10;
X is sulphur and
n is an integer between 5 and 100.

12. Polyester according to claim 7, wherein n is an integer between 5 and 50.

13. Procedure for the preparation of the polyester of claim 11, consisting in the polycondensation of polytransesterification of a biocarboxilic organic acid or one of its alkyl esters having the formula:

(III)

wherein $R_4$ is hydrogen or an alkyl radical containing from 1 to 3 carbon atoms, with a glycol having formula:

(IV)

14. Procedure according to claim 13, wherein the organic bicarboxylic acid having formula (III) is selected from: thio-diacetic acid, thio-dipropionic acid, α,α'-thio-dibutyric acid, α,α'-thio-diisobutyric acid, β,β'-thio-dibutyric acid, γ,γ'-thio-dibutyric acid, thio-divaleric acid, γ,γ'-thio-diisovaleric acid, thio-di(methylpropyl)acetic acid, thio-di(ethyl-propyl)acetic acid, and mixtures of the foregoing.

15. Procedure for the preparation of the solid polymeric electrolyte according to claim 1, consisting in mixing the polyester having formula (I) with the ionic compound.

16. Procedure for the preparation of the solid polymeric electrolyte according to claim 15, wherein the mixing is conducted under heat and in an inert environment.

17. Procedure according to claim 14, wherein the organic bicarboxylic acid is thio-dipropionic acid.

18. Procedure according to claim 9, wherein the glycol having formula (II) is selected from ethylene glycol, di(oxy-ethylene)glycol, tri(oxyethylene)glycol, tetra(oxy-ethylene)glycol and penta(oxy-ethylene)glycol.

19. Electrolytic separator for electro-chemical generators, electro-optical displays, and electro-optical sensors, said separator comprised of a solid polymeric electrolyte according to claim 1.

* * * * *